US010831261B2

(12) United States Patent
Mukherjea et al.

(10) Patent No.: US 10,831,261 B2
(45) Date of Patent: Nov. 10, 2020

(54) COGNITIVE DISPLAY INTERFACE FOR AUGMENTING DISPLAY DEVICE CONTENT WITHIN A RESTRICTED ACCESS SPACE BASED ON USER INPUT

(71) Applicant: INTERNATIONAL BUSINESS MACHINES CORPORATION, Armonk, NY (US)

(72) Inventors: Sougata Mukherjea, New Delhi (IN); Saiprasad Kolluri Venkata Sesha, Bengaluru (IN); Seema Nagar, Bangalore (IN); Kuntal Dey, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 22 days.

(21) Appl. No.: 16/292,626

(22) Filed: Mar. 5, 2019

(65) Prior Publication Data
US 2020/0285303 A1 Sep. 10, 2020

(51) Int. Cl.
*G06F 3/01* (2006.01)
*G06F 3/147* (2006.01)
(Continued)

(52) U.S. Cl.
CPC .............. *G06F 3/011* (2013.01); *G06F 3/041* (2013.01); *G06F 3/147* (2013.01); *G06F 16/248* (2019.01); *G06F 16/2457* (2019.01)

(58) Field of Classification Search
USPC ....................................................... 345/173
See application file for complete search history.

(56) References Cited

U.S. PATENT DOCUMENTS 9,524,589 B1 12/2016 Goenka
9,933,908 B2 4/2018 Poupyrev
(Continued)

FOREIGN PATENT DOCUMENTS

CN 108510826 A 9/2017
EP 3369371 A1 9/2018

OTHER PUBLICATIONS

Mel et al., "The NIST Definition of Cloud Computing," National Institute of Standards and Technology, Information Technology Laboratory, Special Publication 800-145, Sep. 2011 (pp. 1-7).
(Continued)

*Primary Examiner* — Chineyere D Wills-Burns
(74) *Attorney, Agent, or Firm* — Michael A. Petrocelli, Esq.; Kevin P. Radigan, Esq.; Heslin Rothenberg Farley & Mesiti P.C.

(57) ABSTRACT

A cognitive display interface operatively couples to a display device and provides augmentation data for display to a user within a restricted access space based on user input. The interface receives user input and context-related data, with the user providing the user input within the space, and one or more sensors providing the context-related data. The interface analyzes the context-related sensor data to determine a location and an orientation of the user within the space at the time of providing the user input, resolves context of the user input based, at least in part, on the determined location and orientation of the user within the space, and determines a search query from the input and the resolved context. A response to the search query is generated based, at least in part, on searching a database(s), and the interface provides a response as augmentation data for rendering on the display device.

16 Claims, 11 Drawing Sheets

(51) Int. Cl.
    *G06F 16/2457*     (2019.01)
    *G06F 3/041*     (2006.01)
    *G06F 16/248*     (2019.01)

(56) References Cited

U.S. PATENT DOCUMENTS

| | | | |
|---|---|---|---|
| 10,037,343 B1 | 7/2018 | Ellenby et al. | |
| 2011/0276396 A1* | 11/2011 | Rathod | H04L 12/18 |
| | | | 705/14.49 |
| 2014/0129942 A1* | 5/2014 | Rathod | H04N 21/44222 |
| | | | 715/720 |
| 2015/0025917 A1* | 1/2015 | Stempora | G06K 9/0061 |
| | | | 705/4 |
| 2015/0143221 A1* | 5/2015 | Ahuja | G06T 11/60 |
| | | | 715/230 |
| 2015/0185892 A1* | 7/2015 | Chae | G06F 3/044 |
| | | | 345/173 |
| 2015/0323993 A1* | 11/2015 | Levesque | G02B 27/0172 |
| | | | 345/156 |
| 2015/0370320 A1* | 12/2015 | Connor | A61B 5/1126 |
| | | | 345/173 |
| 2016/0038083 A1* | 2/2016 | Ding | A61B 5/1121 |
| | | | 600/388 |
| 2016/0300388 A1* | 10/2016 | Stafford | A63F 13/211 |
| 2017/0060298 A1 | 3/2017 | Hwang et al. | |
| 2017/0069114 A1* | 3/2017 | Kuusk | G06K 19/06103 |
| 2017/0115777 A1* | 4/2017 | Poupyrev | G06F 3/04883 |
| 2017/0195514 A1* | 7/2017 | Goldberg | H04N 1/32128 |
| 2018/0062691 A1* | 3/2018 | Barnett, Jr. | G06F 1/1652 |
| 2018/0336069 A1* | 11/2018 | Soni | G06T 19/006 |
| 2018/0357670 A1* | 12/2018 | DeLuca | G06K 9/6201 |
| 2019/0220583 A1* | 7/2019 | Douglas | G06F 21/316 |
| 2020/0175961 A1* | 6/2020 | Thomson | G10L 15/063 |

OTHER PUBLICATIONS

International Business Machines Corporation (IBM), "Power ISA™ Version 2.07B," Apr. 9, 2015 (pp. 1-1527).
IBM Publication, "z/Architecture Principles of Operation," IBM® Publication No. SA22-7832-11, 12th Edition, Sep. 2017 (pp. 1-1902).
Hakkila et al., "Clothing Integrated Augmented Reality Markers", Proceedings of International Conference on Mobile and Ubiquitous Multimedia (MUM '17), Stuttgart, Germany (Nov. 2017) (pp. 113-121).

* cited by examiner

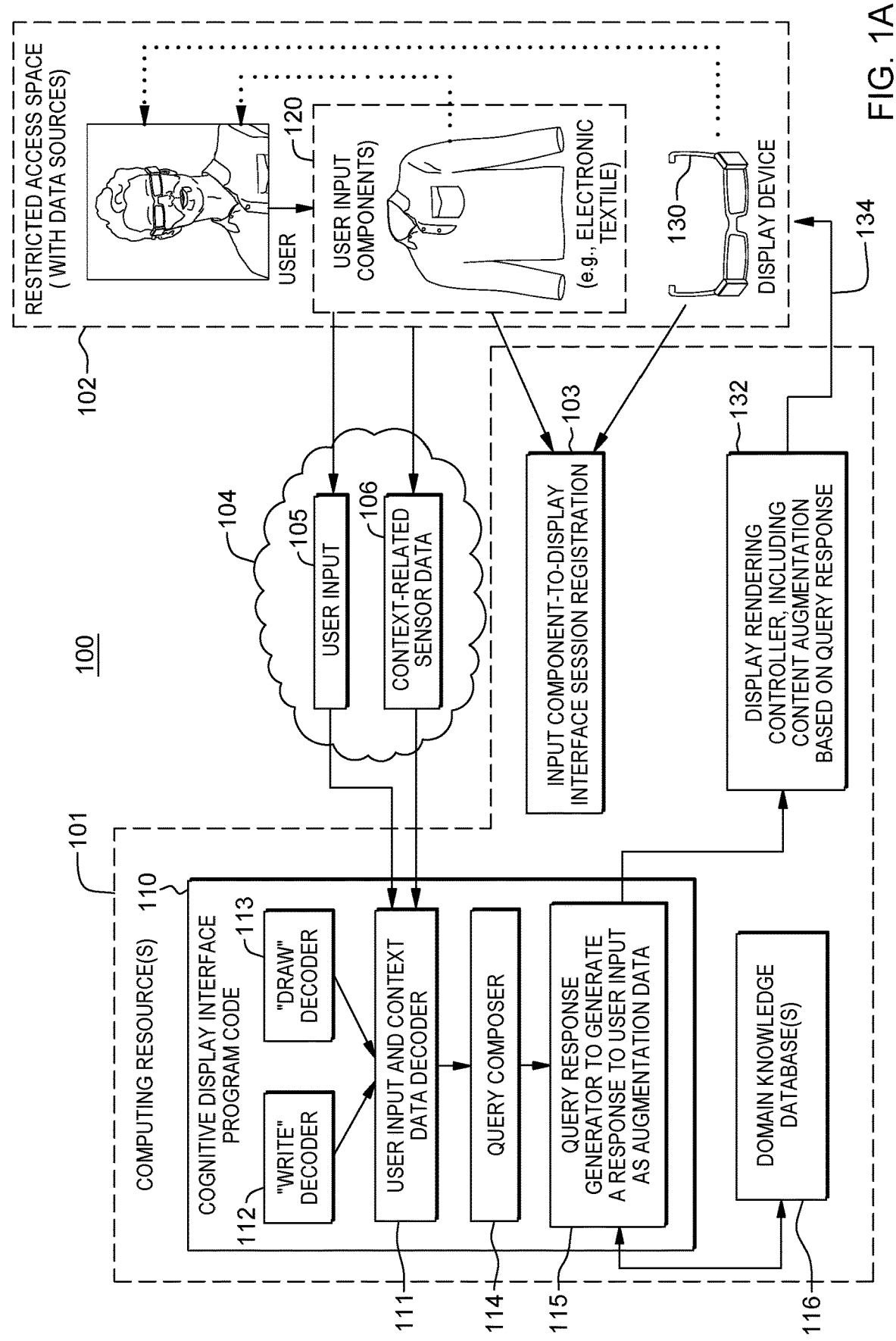

PROVIDING A COGNITIVE DISPLAY INTERFACE TO EXECUTE ON A COMPUTER SYSTEM AND OPERATIVELY COUPLE TO A DISPLAY DEVICE, THE COGNITIVE DISPLAY INTERFACE TO PROVIDE AUGMENTATION DATA TO THE DISPLAY DEVICE FOR DISPLAY TO A USER BASED ON A USER INPUT, THE COGNITIVE DISPLAY INTERFACE: ~600

RECEIVING THE USER INPUT AND CONTEXT-RELATED DATA ASSOCIATED WITH THE USER INPUT, THE USER PROVIDING THE USER INPUT WITHIN A RESTRICTED ACCESS SPACE, THE RESTRICTED ACCESS SPACE INCLUDING ONE OR MORE SENSORS, THE ONE OR MORE SENSORS PROVIDING, AT LEAST IN PART, THE CONTEXT-RELATED DATA; ~602

ANALYZING THE CONTEXT-RELATED DATA TO DETERMINE, AT LEAST IN PART THEREFROM, A LOCATION AND AN ORIENTATION OF THE USER WITHIN THE RESTRICTED ACCESS SPACE AT THE TIME OF THE USER PROVIDING THE USER INPUT; ~604

RESOLVING CONTEXT OF THE USER INPUT BASED, AT LEAST IN PART, ON THE DETERMINED LOCATION AND ORIENTATION OF THE USER WITHIN THE RESTRICTED ACCESS SPACE AT THE TIME OF PROVIDING THE USER INPUT; ~606

DETERMINING A SEARCH QUERY FROM, AT LEAST IN PART, THE USER INPUT AND THE RESOLVED CONTEXT OF THE USER INPUT; ~608

GENERATING A RESPONSE TO THE SEARCH QUERY BASED, AT LEAST IN PART, ON SEARCHING ONE OR MORE DATABASES; AND ~610

PROVIDING THE RESPONSE AS AUGMENTATION DATA FOR RENDERING ON THE DISPLAY DEVICE FOR DISPLAY TO THE USER ~612

IN WHICH DETERMINING THE SEARCH QUERY BY THE COGNITIVE DISPLAY INTERFACE IS FURTHER WITH REFERENCE TO RECEIVED DATA INDICATIVE OF LOCATION OF ONE OR MORE OBJECTS WITHIN THE RESTRICTED ACCESS SPACE AT THE TIME OF THE USER PROVIDING THE USER INPUT ~614

FIG. 6A

IN WHICH THE COGNITIVE DISPLAY INTERFACE FURTHER OPERATIVELY COUPLES TO A USER INPUT COMPONENT WITHIN THE RESTRICTED ACCESS SPACE, THE USER INPUT BEING PROVIDED BY THE USER VIA THE USER INPUT COMPONENT, AND THE USER INPUT COMPONENT BEING AN ELECTRONIC COMPONENT SEPARATE FROM THE DISPLAY DEVICE ~616

IN WHICH THE USER INPUT COMPONENT INCLUDES AN ELECTRONIC TEXTILE, THE ELECTRONIC TEXTILE BEING WORN BY THE USER ~618

IN WHICH THE USER INPUT COMPONENT INCLUDES A PLURALITY OF TOUCH-SENSITIVE ELECTRONIC SENSORS, THE USER INPUT BEING PROVIDED BY USER CONTACT WITH ONE OR MORE SENSORS OF THE PLURALITY OF TOUCH-SENSITIVE SENSORS WHILE WRITING ON THE USER INPUT COMPONENT ~620

IN WHICH THE COGNITIVE DISPLAY INTERFACE FURTHER RECEIVES A REGISTRATION OF THE USER INPUT COMPONENT AND THE DISPLAY DEVICE FOR AN INTERFACE SESSION, THE RECEIVING, ANALYZING, RESOLVING, DETERMINING, GENERATING AND PROVIDING OCCURRING DURING THE INTERFACE SESSION ~622

IN WHICH PROVIDING THE RESPONSE AS AUGMENTATION DATA OCCURS IN ADDITION TO DISPLAY OF AN EXISTING IMAGE ON THE DISPLAY DEVICE ~624

IN WHICH THE DISPLAY DEVICE LACKS DIRECT USER CONTROL OF DISPLAY CONTENT, AND IS A DEVICE SELECTED FROM THE GROUP CONSISTING OF AN AUGMENTED CONTENT DEVICE, AN AUGMENTED REALITY DEVICE, AND A VIRTUAL REALITY DEVICE ~626

IN WHICH THE DISPLAY DEVICE IS WORN BY THE USER ~628

IN WHICH THE RESTRICTED ACCESS SPACE IS A DATA CENTER INSTALLATION ~630

FIG. 6B

COGNITIVE DISPLAY INTERFACE FOR AUGMENTING DISPLAY DEVICE CONTENT WITHIN A RESTRICTED ACCESS SPACE BASED ON USER INPUT

BACKGROUND

A data center is often a secure, restricted access space within a building or one or more buildings used to house computer systems and associated components. In a data center installation, the computing equipment, such as the computer servers, are commonly placed in a series of racks arranged in one or more rows of the data center. Typically, the data center includes redundant or backup components and infrastructure for power supply, data communication connections, environmental controls, and various security systems/devices. Operator interaction within a data center with a central server or controller of the data center installation can often be difficult. Access restrictions can make carrying personal mobile devices into a secure data center prohibited, and where allowed, connecting personal devices to a data center server or controller can often present a high entry barrier, making the process difficult, if not impractical.

SUMMARY

Certain shortcomings of the prior art are overcome and additional advantages are provided through the provision of a method which includes providing a cognitive display interface to execute on a computer system and operatively couple to a display device. The cognitive display interface provides augmentation data to the display device for display to a user based on a user input. The cognitive display interface receives the user input and context-related data associated with the user input, with the user providing the user input within a restricted access space, the restricted access space including one or more sensors, the one or more sensors providing, at least in part, the context-related data. The cognitive display interface analyzes the context-related data to determine, at least in part therefrom, a location and an orientation of the user within the restricted access space at the time of the user providing the user input. The display interface resolves the context of the user input based, at least in part, on the determined location and orientation of the user within the restricted access space at the time of providing the user input, and determines a search query from, at least in part, the user input and the resolved context of the user input. The cognitive display interface generates a response to the search query based, at least in part, on searching one or more databases, and provides the response as augmentation data for rendering on the display device for display to the user.

Advantageously, the cognitive display interface allows a user within a restricted access space to access data on or via a computing resource, such as a central server or controller within or associated with the restricted access space, and obtain authorized information, and have the information displayed back to the user on the display device. The interface can thus assist the user in performing a task within the restricted access space by providing, for instance, responses to user queries, notwithstanding that the user is within a secure or restricted access space.

In one or more embodiments, determining the search query by the cognitive display interface is further with reference to received data indicative of a location of one or more objects within the restricted access space at the time of the user providing the user input. This advantageously provides additional context information for resolving context of user input.

In one or more embodiments, the cognitive display interface further operatively couples to a user input component within the restricted access space. The user input is provided by the user via the user input component, and the user input component is an electronic component separate from the display device. For instance, the user input component can be an electronic textile, such as an electronic textile configured as a garment worn by the user. Further, in one or more embodiments, the user input component includes a plurality of touch-sensitive electronic sensors, with the user input being provided by user contact with one or more sensors of the plurality of touch-sensitive sensors while writing on the user input component.

In one or more embodiments, the cognitive display interface receives a registration of the user input component at a display device for an interface session. The cognitive display interface processing, including the receiving, analyzing, resolving, determining, generating and providing occur during the interface session. This advantageously allows different user input components and different display devices to be used within the restricted access space.

In one or more embodiments, providing the response as augmentation data occurs in addition to display of an existing image on the display device.

In one or more implementations, the display device lacks direct user-control of display content, being for instance, an output display device only. In one or more embodiments, the display is an augmented content device, an augmented reality device, or a virtual reality device. Further, in one or more embodiments, the display device is worn by the user, for instance, as glasses or a headset.

In one or more embodiments, the restricted access space is a data center installation.

Systems and computer program products relating to one or more aspects are also described and claimed herein. Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 1A depicts one embodiment of a system, in accordance with one or more aspects of the present invention;

FIGS. 6A-6B depict an additional example of processing, in accordance with one or more aspects of the present invention;

DETAILED DESCRIPTION

Aspects of the present invention and certain features, advantages and details thereof, are explained more fully below with reference to the non-limiting example(s) illustrated in the accompanying drawings. Descriptions of well-known materials, systems, devices, processing techniques, etc., are omitted so as to not unnecessarily obscure the invention in detail. It should be understood, however, that the detailed description and the specific example(s), while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application, for instance, for providing a computer-implemented, cognitive display interface to operatively couple to a display device and provide augmentation data to the display device for display where the provided augmentation data is driven by a user input.

Note also that illustrative embodiments are described below using specific code, designs, architectures, protocols, layouts, schematics, or tools only as examples, and are not limited to the illustrative embodiments. Furthermore, the illustrative embodiments can be described in certain instances using particular software, tools, and data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

The examples of the disclosure are used only for clarity of description, and are not limiting to the illustrative embodiments. Additional data, operations, actions, tasks, activities, and manipulations will be conceivable from this disclosure and the same are contemplated within the scope of the illustrative embodiments.

Any advantages listed herein are only examples, and are not intended to be limiting to the illustrative embodiments. Additional or different advantages can be realized by specific illustrative embodiments. Furthermore, a particular illustrative embodiment can have some, all, or none of the advantages listed herein.

Figure 7:
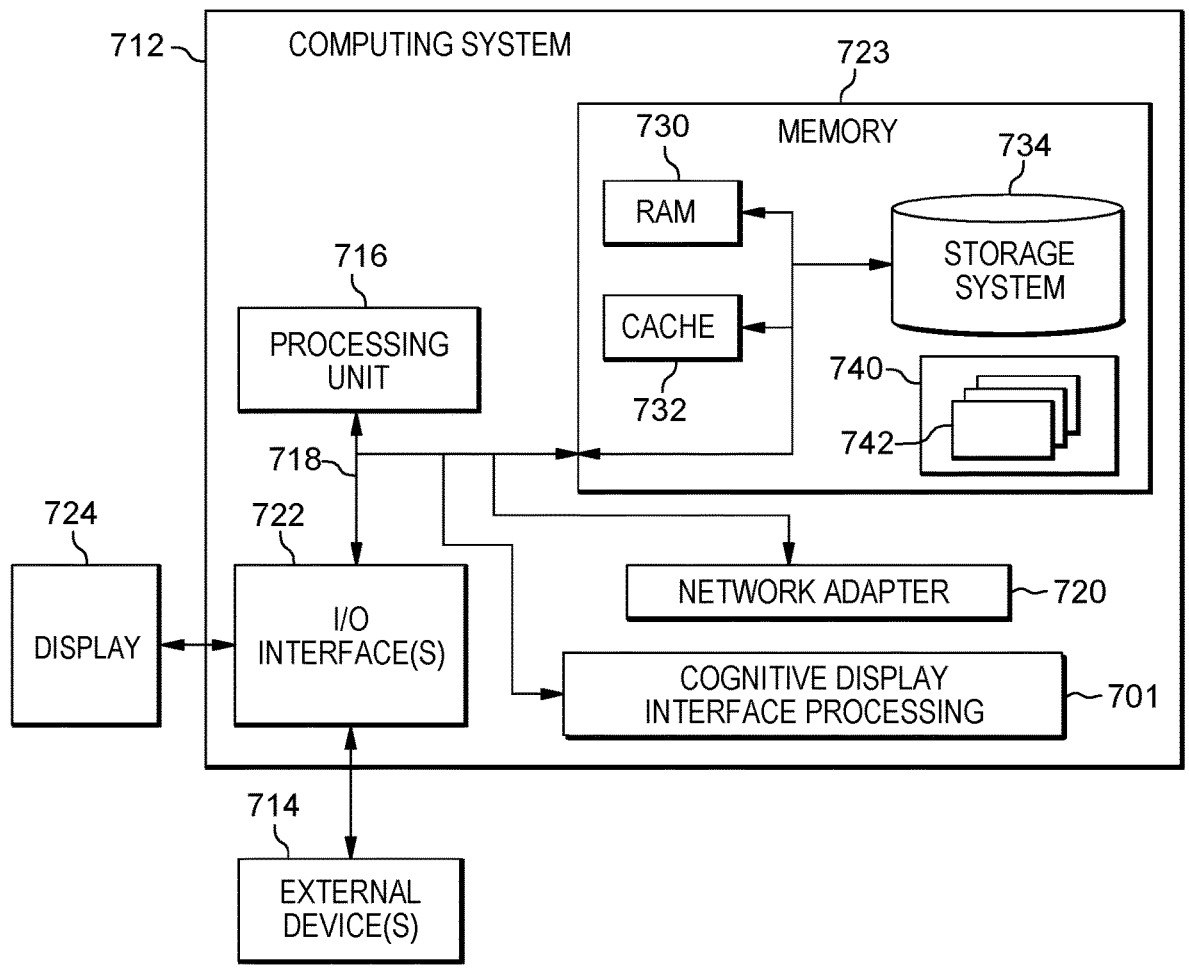
FIG. 7 depicts one embodiment of a computing system which can implement or facilitate implementing cognitive display interface processing, in accordance with one or more aspects of the present invention.

As understood by one skilled in the art, program code, as referred to in this application, can include both software and hardware. For example, program code in certain embodiments of the present invention could include fixed function hardware, while other embodiments can utilize a software-based implementation of the functionality described. Certain embodiments combine both types of program code. One example of program code, also referred to as one or more programs, is depicted in FIG. 7 as program/utility 740, having a set (at least one) of program modules 742, which can be stored in memory 723.

As noted initially, and by way of example only, user interaction with a computing resource within a secure or restricted access space, such as inside a data center, can often be difficult. Due to access restrictions, possessing a smart device within a secure space is often prohibited, and where allowed, connecting the smart device to a server or controller within the secure space can present a high entry barrier. In addition to this, augmenting content using, for instance, augmented reality (AR) devices and virtual reality (VR) devices, can beneficially assist operation personnel, and therefore is of interest. Augmented content displays can be helpful in providing augmented, real-time content to personnel within a restricted access space, and can often satisfy several purposes, including providing help to perform a task. A shortcoming to the standard augmented reality devices (or virtual reality devices) however, is that the devices are output only. That is, the user cannot provide content control input to the devices, with such display devices being non-user-input display devices lacking direct user-input capability. For instance, there is no facility in existing augmented reality or virtual reality display devices worn by a user that allows the user to provide specific queries. Thus, augmenting content based on user-driven additional information, such as custom search responses to user inquiries, is typically not possible using today's AR and VR display devices.

Embodiments of the present invention include a method, a computer system, and a computer program product where program code executing on one or more computer systems provides a cognitive display interface which operatively couples, for instance, a user input component, such as an electronic textile, and a display device, such as an augmented reality device or virtual reality device for an interface session. Advantageously, the cognitive display interface facilitates content augmentation on an otherwise non-user-controlled display device, such as an augmented reality device. The augmented data content is driven by user input made, for instance, on a user-controlled input component, such as an electronic textile, as well as by local contextual resolution at the time of the user input.

A cognitive display interface such as disclosed herein allows interaction of a user within a secure space with a computing resource, such as a central server or controller within or associated with the secure space, to (for instance) access data within the secure space that can assist the user in performing a task within the secure space. Using the cognitive display interface, the user control provisions of augmentation data displayed within the restricted access space on a non-user-input display device that otherwise lacks direct user input capability. Further, depending on the implementation, the computing resource, for instance, central server or controller, can determine a level of augmentation data that is appropriate for the particular user within the secure space. For instance, different users may have different access levels to data within the secure space, and depending on the user, and the user's input, the interface can tailor a response based on the user's authorization level. In this manner, a technician within a secure space can look up and receive information appropriate to facilitate performing an assigned activity.

In one or more implementations, the user input is provided via a user input component that is, for instance, a user-controlled component. In one or more embodiments, the user input component is a user-input-only component, with only sufficient processing or electronic capabilities to facilitate providing input data such as described herein. That is, the user input component is not a smart electronic device. This advantageously assists with security within the secure. Advantageously, by using a cognitive display interface such as disclosed herein, no smart electronic device is required within the secure space in order to access data from a computing resource, such as a central server controller of the secure space. The cognitive display interface advantageously provides a communication capability which can resolve user input (provided via a non-smart device) for display, for instance, as augmented data, on an output-only display device lacking direct user-input capability, such as an augmented reality display or virtual reality display device. In operation, the user might be able to access a wide variety of data within the secure space, and in one or more embodiments, access may depend on the user's authorization level. For instance, the augmentation data could be in response to simple user queries about data center installation configuration and operation, as well as more specific questions regarding, for instance, operational characteristics of one or more computer systems, servers, or other components within the secure space. In one or more implementations, the response as augmentation data provided on the display device could be particular system details, such as system hardware, software, firmware, as well as processing details. Any response allowed by the secure server or controller can be provided to the user. For instance, the user could provide an input inquiring as to operational characteristics or values of a particular server or system in front of the user, and through, context-related sensor data, the interface can resolve the user input to provide the desired information to the user via the output-only display device.

Embodiments of the present invention are inextricably tied to computing and solve an existing issue with operator access to information in a secure facility. A cognitive display interface is provided to execute on a computer system and operatively couple to a display device, as well as to a user input component within the restricted access space. The cognitive display interface can control provision of augmentation data within the restricted access space to the user via the display device based on user input provided via the user input component. Advantageously, a user, such as a technician, within the restricted access space can access information helpful in performing assigned tasks. In one or more implementations, the user input component and the display device are not smart devices, but rather are dedicated devices, for instance, for input of data and output display of data, respectively.

By way of example, FIG. 1A depicts one embodiment of a system 100 incorporating, or using, various aspects of the present invention. In the embodiment illustrated, system 100 includes one or more computing resource(s) 101, a restricted access space 102, and a network 104. Restricted access space 102 is, in one or more embodiments, a secure space which can include various data sources, such as one or more user input component(s) 120, as well as one or more other types of data source components, to facilitate, for instance, data collection within restricted access space 102. By way of example, restricted access space 102 could be a data center installation, or could be any other restricted or secure space, as described herein. Within restricted access space 102, many different objects, structures, systems, elements, etc. (generally referred to herein as objects) can reside, which a user might service, interact with, inquire about, etc.

As noted, restricted access space 102 can include one or more user input components 120, such as one or more electronic textiles. Further, one or more display devices 130 are used within restricted access space 102, with augmented reality glasses and virtual reality headsets being examples of display devices 130. As illustrated, in one or more embodiments, user input component 120 and display device 130 can both be configured to be worn by the user within restricted access space 102.

In one or more implementations, computing resource(s) 101 houses and/or executes cognitive display interface 110 program code, in accordance with one or more aspects of the present invention. For instance, computing resource(s) 101 can be a server or other computing-system-implemented resource(s) that is separate from user input component(s) 120 and display device 130, or have aspects thereof integrated in whole or in part into input component 120 or display device 130. For illustrative purposes only, computing resource(s) 101 is depicted in FIG. 1A as being separate from restricted access space 102. This is a non-limiting example of an implementation. In one or more other implementations, computing resource(s) 101 on which cognitive display interface program code 110 executes could be located within restricted access space 102. For instance, computing resource(s) 101 could be a central server or controller of restricted access space 102 in the case where restricted access space 102 is a secure or restricted space, such as a data center installation.

Briefly described, computing resource(s) 101 can include one or more processors, for instance, central processing units (CPUs). As known, a processor can include functional components used in the execution of program code, such as functional components to fetch program code from locations such as cache or main memory, decode program code and execute program code, access memory for instruction execution, and write results of the executed instructions or code. A processor can also include a register(s) to be used by one or more of the functional components. In one or more embodiments, computing resource(s) 101 can include memory, input/output, a network interface, and storage, which can include and/or access one or more domain knowledge databases. The components of computing environment 101 can be coupled to each other via one or more buses and/or other connections. Bus connections can be one or more of any of several types of bus structures, including a memory bus or a memory controller, a peripheral bus, an accelerated graphics port, and a processor or local bus, using any of a variety of bus architectures. By way of example, and not limitation, such architectures include the industry standard architecture (ISA), the microchannel architecture (MCA), the enhanced ISA (EISA), the video electronics standard association (VESA), local bus, and the peripheral component interconnect (PCI). Examples of computing resource(s) or computer system(s), which can implement one or more aspects disclosed herein are described further below with reference to FIGS. 7-9.

As noted, depending on the implementation, one or more aspects of computing resource(s) 101 could be located within restricted access space 102, or associated with restricted access space 102, or located remote from the restricted access space. For instance, one or more aspects of computing resource(s) 101 could be remotely implemented, such as in a cloud-based environment. By way of example only, system 100 can include, or utilize, one or more networks 104 for, for instance, interfacing various aspects of computing resource(s) 101, as well as for interfacing user input component(s) 120 with cognitive display interface 110, and/or cognitive display interface 110 with display device(s) 130. By way of example, network 104 could be, for instance, a telecommunications network, a local area network (LAN), a wide area network (WAN), such as the Internet, or a combination thereof, and can include wired, wireless, fiber optic connections, etc. The network can include one or more wired and/or wireless networks that are capable of receiving and transmitting data, including user input generated by the user, as well as a response to the user input for rendering on the display device, including any responsive image and/or video signals.

User input component(s) 120 can be, or include, any of a variety of user inputs, and can include more than one input component being used in combination. For instance, user input component(s) 120 can include one or more activity monitors and input-receiving devices, including, if desired, video and/or audio monitoring of the user within the restricted access space. More particularly, monitoring a user within restricted access space 102 can be performed in a variety of ways, including, via a microphone, a video camera, Internet of Things (IoT) devices, monitoring or sensing technologies, including one or more monitoring devices worn by the user when within the restricted access space. In one embodiment, the user input component(s) 120 is, or includes, an electronic textile, such as an electronic textile configured as a garment worn by the user within the restricted access space. Note that in one or more other embodiments, the electronic textile could be configured as only a portion of a garment, such as a shirtsleeve, waistband, etc. As understood in the art, an electronic textile refers to a smart textile (or smart fabric or smart garment) that has electronics embedded within the garment to allow, for instance, a user to communicate by, for instance, engaging one or more sensors of a plurality of touch-sensitive electronic sensors of the electronic textile to write and/or draw an inquiry or command. In addition to touch-sensitive electronic sensors, supporting circuitry including, for instance, communication circuitry, can also be provided as part of the electronic textile for communication, for instance, of the user input to cognitive display interface 110, as described herein. In one or more other implementations, user input component(s) 120 can be, for instance, any electronic-contact-based user input, where the user contacts one or more sensors of a plurality of touch-sensitive sensors of the input component in order to provide a user input 105.

In one or more embodiments, user input 105 is provided via network 104 to computing resource(s) 101, and in particular, to cognitive display interface 110. Note in this regard that, prior to receiving user input 105 at cognitive display interface 110, an input component-to-display interface session registration 103 can occur where, for instance, a user input component(s) 120 to be used by a user within restricted access space 102 is associated with a particular display device 130 to be used within the restricted access space. In the example of FIG. 1A, both the electronic textile and display device shown are worn by the user within restricted access space 102, which is by way of example only. Advantageously, a user input component configured from electronic textile as a garment inherently has a front, back, and sides, which can be beneficial when resolving context of a user input, as described herein. Further, note that in one embodiment, context-related sensor data 106 is also gathered within restricted access space 102, via one or more data sources, and provided via network 104 to cognitive display interface 110, that is, along with user input 105, to assist the interface in determining context of the user input.

Input data 105 and context-related sensor data 106 are received by cognitive display interface 110 on computing resource(s) 101 at, for instance, a user input and context data decoder 111. In one or more embodiments, user input 105 can include both written text data translatable into, for instance, a text query, as well as, or alternatively, drawing or symbol data. The user input decoder 111 includes, or can have associated therewith, both a "write" decoder component 112 and a "draw" decoder component 113. By way of example, the user could input data such as "What does the A symbol mean on the computer rack in front of me?" In this example, the words of the input data are decoded by write decoder 112, and the "A" symbol is decoded by draw decoder 113. For instance, the "writing" part of user input 105 can be decoded by mapping shapes drawn by the user into alphabetical characters, mapping the alphabetical characters into words, performing spelling-corrections (in one embodiment), and forming a textual component of a search query based thereon. The "drawing" part of user input can be decoded by extracting the parts of the user query that could not be mapped to alphabetical characters, and creating an image for each extracted part. A query composer component 114 uses the decoded write and draw information, along with resolving any contextual words or drawings, to compose a search query to be resolved. By way of example, a contextual word that might need to be resolved could be "this" in the above example. The resolution can include determining location and orientation of the user at the time of providing the user input. For instance, location and orientation of the user within the restricted access space can be ascertained via one or more data sensors within the restricted access space. Alternatively, or additionally, by configuring the user input component as an electronic textile garment worn by the user, location and orientation of the user can be readily obtained within the restricted access space. As noted, an electronic textile configured as a garment worn by the user inherently has a front, back, and sides, and orientation of the user can be resolved by determining the front of the electronic textile garment at the time of inputting the user input.

As illustrated in FIG. 1A, cognitive display interface 110 includes, in one or more embodiments, a query response generator component 115 to generate a response to the user input, which can include accessing one or more databases of relevant domain knowledge 116. For instance, in the case of a data center, the domain knowledge could reside within the data center and include detailed information on the data center installation, including components, such as computing equipment housed in the racks, location of racks within the data center, as well as other data center components, such as network cables, tiles, diffusers, power cables, air-conditioning components, etc., as well as specified, current and/or projected operational data for the components.

The response is provided as augmentation data for rendering on the particular display device 130 registered as part of the input component-to-display interface session registration 103. For instance, in the embodiment depicted, the augmentation data is forwarded via a display-rendering controller 132 to display device 130 and rendered. Note that, in one or more embodiments, the response as augmentation data can be augmenting data that is in addition to an existing image or data appearing on the display device. For instance, in the case of augmented reality glasses, the user can be viewing the restricted access space, with the augmented data being superimposed over the viewed restricted access space, for instance, on a portion of the display device. Note that display-rendering controller 132 can be part of cognitive display interface 110, or separate from the cognitive display interface. For instance, display-rendering controller 132 could be associated with the particular display device 130, or could be linked to the display device 130 via any appropriate communication link, including over the same or a different network 104 as used to communicate the user input and context-related sensor data.

In some embodiments of the present invention, cognitive display interface 110 on computing resource(s) 101 can utilize existing cognitive analysis tools or agents to decode the user input, compose the search query, and/or resolve the search query based, for instance, on the domain knowledge, as described herein. Some aspects of the present invention can utilize IBM Watson® as a cognitive agent. IBM Watson® is a registered trademark of International Business Machines Corporation, Armonk, N.Y., USA. In embodiments of the present invention, one or more aspects of the cognitive display interface program code can interface with IBM Watson® application programming interfaces (APIs) to perform a cognitive analysis of the received user input, and context data, as well as to construct a search query and resolve the search query, for instance, with reference to domain knowledge. In some embodiments of the present invention, cognitive display interface program code interfaces with the application programming interfaces (APIs) that are part of a known, cognitive agent, such as the IBM Watson® application program interface (API), a product of International Business Machines Corporation.

In some embodiments of the present invention, certain of the APIs of the IBM Watson® API include a cognitive agent that includes one or more programs, including, but not limited to, natural language classifiers, Retrieve and Rank (i.e., a service available through IBM Watson® developer cloud that can surface the most relevant information from a collection of documents), concepts/visual insights, tradeoff analytics, document conversion, and/or relationship extraction. In an embodiment of the present invention, one or more programs are provided to analyze the user input obtained across various sources, including one or more of a natural language classifier, Retrieve and Rank APIs, and tradeoff analytics APIs.

Further, in some embodiments of the present invention, cognitive display interface 110 can include, or utilize, a neural network to analyze user input, to construct search queries, and resolve the search queries with reference to domain knowledge. Neural networks are a programming paradigm which enable a computer to learn from observational data, in this case, user input, as well as context data. The learning can be referred to as deep learning, which is a set of techniques for learning in neural networks. Neural networks, including modular neural networks, are capable of pattern (e.g., state) recognition, with speed, accuracy, and efficiency. Modern neural networks are non-linear statistical data modeling tools. They can be used to model complex relationship between inputs and outputs, or to identify patterns (e.g., states) in data (i.e., neural networks are non-linear statistical data modeling or decision making tools). In general, cognitive display interface program code utilizing neural networks can model complex relationships between inputs and outputs and identify patterns of data. Because of the speed and efficiency of neural networks, especially when parsing multiple data sets, neural networks and deep learning provide solutions to many problems in multiple-source processing.

In one or more implementations, one or both of user input component 120 and display device 130 could be generic devices owned by, for instance, the restricted access space facility within which they are being used. Alternatively, either user input component 120 or display device 130 could be owned by the user. As noted, operation of system 100 can begin, in one or more embodiments, with a user input component-to-display interface session registration 103, which relates a particular input component 120 and the display device 130 for the interface session, which (in one or more embodiments) can exist until terminated.

As noted, in one or more embodiments, electronic input 120 can be an electronic textile, which includes a plurality of touch-sensitive sensors or elements, with sensor enablement or contact by the user resulting in user input 105 being generated for forwarding to cognitive display interface 110, for instance, via network 104. In addition to touch-sensitive electronic sensors, supporting circuitry including, for instance, communication circuitry, can also be provided as part of user input component 120 for communicating user input 105 provided by the user to cognitive display interface 110.

In one or more embodiments, display device 130 can be, or include, for instance, an augmented reality (AR) device or a virtual reality (VR) device, such as augmented reality glasses or a virtual reality headset. As used herein, an augmented reality display device is a device where objects that reside in the real world, or other information, can be "augmented" or provided by computer-generated perceptual information, across one or more sensory modalities, including visual, auditory, haptic, etc. The overlaid sensory information can be constructive (i.e., additive to the natural environment depicted) or destructive (i.e., masking of the natural environment), and can be seamlessly interwoven with the physical world depicted in the display such that it can be perceived as an immersive aspect of the real environment. In contrast, virtual reality replaces the real world environment with a simulated environment. The virtual reality environment can be similar to the real world, or disconnected. Augmented reality systems can be considered a form of virtual reality that layers virtual information over, for instance, a real-world view seen through glasses or a live camera feed into a headset. Augmented reality glasses and virtual reality headsets typically consist of a head-mounted display with a small screen or lens in front of the user's field of vision, such as shown in FIG. 1A.

Figure 1B:
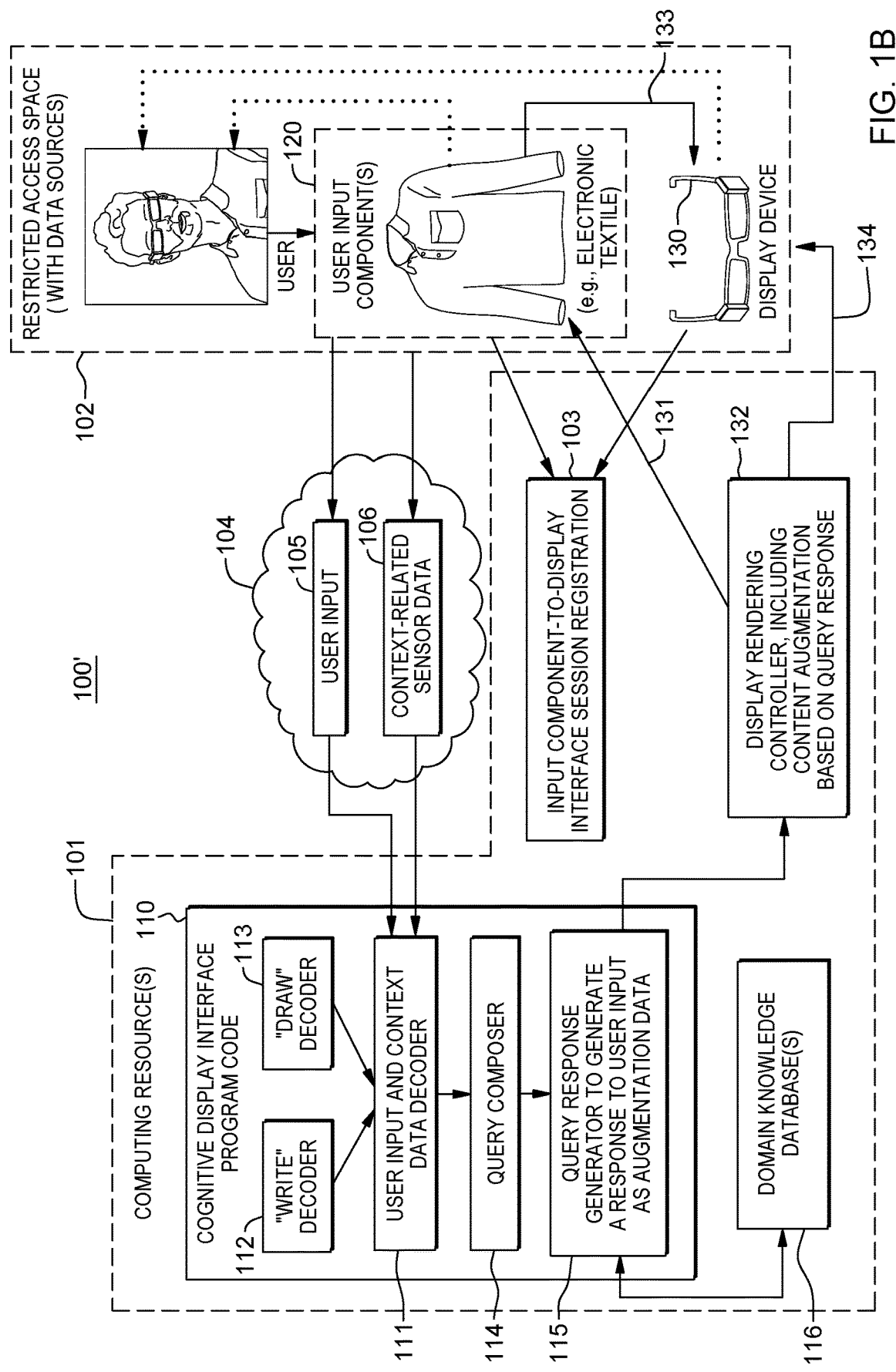
FIG. 1B depicts a further embodiment of a system, in accordance with one or more aspects of the present invention.

In FIG. 1A, the user drives, via user input component 120, display of content (such as augmentation data) on display device 130 via the cognitive display interface 110. In the depicted example, user input component 120 does not communicate data directly in any manner with display device 130. FIG. 1B depicts a system 100' similar to system 100 of FIG. 1A, with exception that the display-rendering controller 132 forwards augmentation data to user input component 120 via communication link 131, and user input component 120 then provides the augmentation data to display device 130 via a communication link 133. This may be in addition to, or in place of, communication link 134 between display-rendering controller 132 and display device 130. As noted initially herein, this and many other variations to the embodiment(s) depicted are possible based on the description provided herein. In one or more implementations, links 131, 133 & 134 can be dedicated communication links or channels between components, or be implemented across a network, such as network 104.

Figure 2:
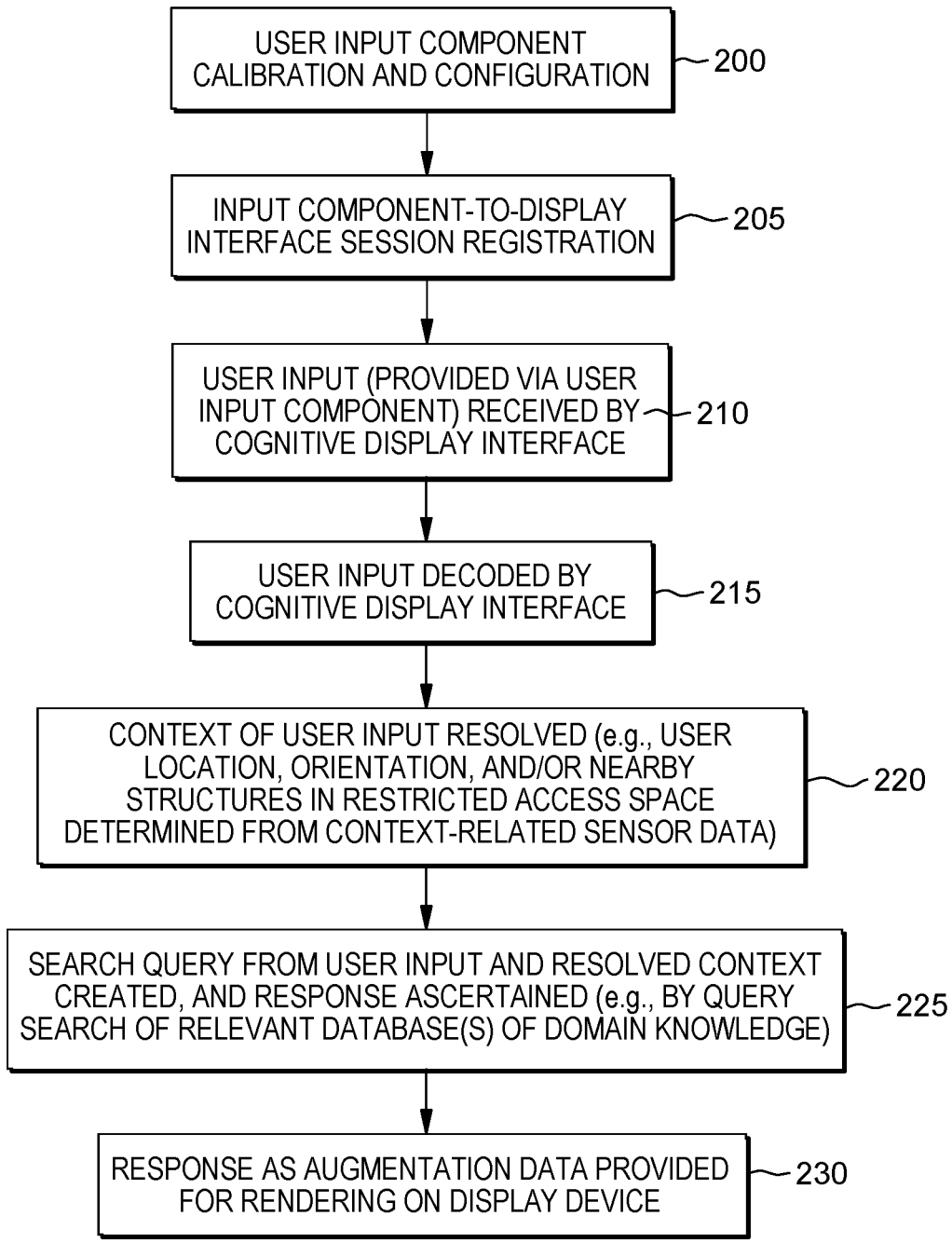
FIG. 2 depicts one embodiment of cognitive display interface processing, in accordance with one or more aspects of the present invention.

By way of further example, FIG. 2 depicts one embodiment of cognitive display interface processing, in accordance with one or more aspects of the present invention.

Initially, a user input component is calibrated and configured 200. For instance, in the case where the user input component is an electronic textile configured as a garment, the textile is calibrated and configured, with the garment being enabled with location sensors, orientation sensors, and identifiers, as well as a capability to identify and interact with the computing resource(s) 101 (FIG. 1), and more particularly, the cognitive display interface 110 (FIG. 1) via a network coupling of the input component to the computing resource(s).

In one or more embodiments, an input component-to-display interface session registration 205 is performed. For instance, an augmented reality device or virtual reality device can be registered as the display device, along with a given user input component, such as a given electronic textile. Either the display device or input component can belong to the user or the organization or facility within which the device and component are to be used. In one or more other implementations, the user input component(s) and the display device(s) both belong to the facility within which the device(s) and component(s) are to be used. In such a case, a particular user input component could be paired with a particular display device for use within the restricted access space over an extended period of time. In one or more other implementations, the user input component-to-display interface session registration could occur, for instance, each time a user enters the restricted access space, and is to employ an interface such as described herein.

As noted, user input from the user input component is received by the cognitive display interface 210. This is part of a user-query input phase where, in one or more embodiments, a user contacts the user input component, such as electronic textile, and draws, for instance, with a finger or stylus, to "write" and/or "draw" on the surface of the input component. This action can, in one or more embodiments, result in contact pressure on touch-sensitive electronic sensors of the input component, with the physical contact and writing action resulting in generating the user input data to be analyzed by the cognitive display interface. As noted, this is one example only of a user input component. Generally, the user input component is a non-smart component capable of receiving user input and converting the user input into user input data that can be transferred to, and parsed by, the cognitive display interface. In one or more other implementations, the user input component includes a microphone, with the user input being provided as audio input, that is then converted by the user input component to an electronic signal or digital data, that is forwarded to the cognitive display interface for parsing.

The cognitive display interface identifies, during a query-decoding phase, any text and/or drawings provided by the user as part of the user input 215. This can include a context resolution process to resolve, where appropriate, local context of the user input based on, for instance, location and orientation of the user and/or user input component within the restricted access space, as well as location of objects, items, structures, etc., within the restricted access space 220, such as one or more objects closest to the user. The cognitive display interface, in one or more embodiments, includes a search query composition phase, where the identified elements, such as the text and/or drawing(s), as well as the user input context, are used to compose or create a search query 225.

The cognitive display interface generates a response to the search query by referencing, for instance, one or more searchable databases containing relevant domain knowledge, including any knowledge specific to the restricted access space facility, to generate an appropriate response. The process can include, in one or more embodiments, cognitively analyzing domain-accessible data to the interface program code, for instance, across a network, such as the Internet. The cognitive display interface uses the domain knowledge obtained, along with the search query, to generate a response specific to the user input. The response can be generated from one or more sources. As noted above, in some embodiments of the present invention, the cognitive display interface can be or utilize a cognitive analysis agent (such as IBM Watson®) to analyze relevant data and extract therefrom an appropriate response. In one or more embodiments, the response can include text, images, and/or video related and responsive to the user input. The response is forwarded, in one or more embodiments, as augmentation data for rendering on the display device using, for instance, existing augmented content transformation and rendering techniques implemented via the display-rendering controller (see FIGS. 1A & 1B), which can be part of the cognitive display interface, or separate.

Figure 3:
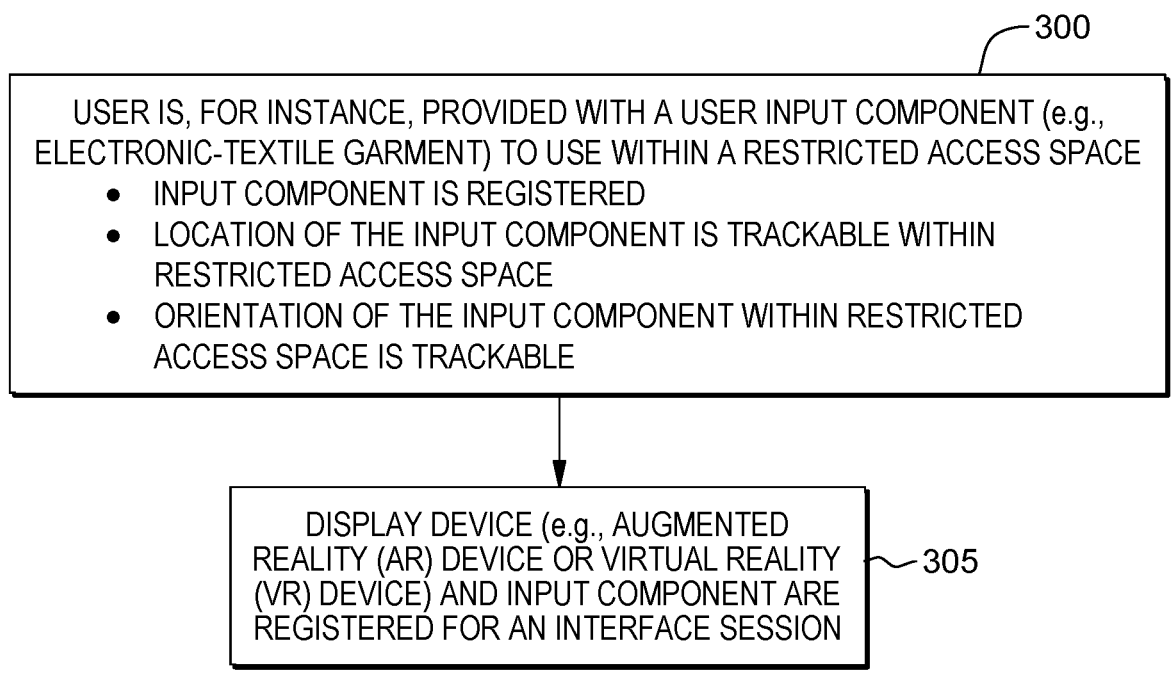
FIG. 3 depicts one embodiment of an interface session registration process, where a user input component and display device are registered for an interface session, in accordance with one or more aspects of the present invention.

FIG. 3 depicts one embodiment of initiation processing for, for instance, bootstrapping an interface session, in accordance with one or more aspects of the present invention.

By way of example, a user enters the restricted access space and is provided with a user input component, such as an electronic textile garment, to use (e.g., wear) within the restricted access space 300. The user input component is a user "controlled" device that is characterized as being a registered device within the restricted access space, a trackable device within the restricted access space, and an orientation-trackable device within the restricted access space. For instance, where the user input component is an electronic textile, the textile is registered with the restricted access space facility, such that one or more controllers or servers within the restricted access space know the electronic textile, and are capable of receiving data from (or interacting with) communication sensors on the textile. The electronic textile is trackable in terms of location and orientation within the restricted access space. For instance, one or more servers or controllers within the restricted access space can determine which part of the restricted access space the electronic textile is located in at any given time using (for instance) sensor signal strength triangulation, and/or other sensor-based techniques. Further, input component orientation within the restricted access space is known. For instance, in an embodiment where the input component is an electronic textile worn by the user, the direction that is the front, back and side of the textile will be known, and readily identified computationally within the restricted access space, for instance, by the cognitive display interface, as well as being trackable within the restricted access space using identifiers and sensors fitted on the electronic textile, that facilitate identifying position and orientation of the sensors.

In addition, the display device, such as an augmented reality device or a virtual reality device, as well as the user input component, are registered for an interface session 305. This registration process is to correlate a particular user input component (e.g., electronic textile) and a particular display device to the cognitive display interface for an interface session.

Figure 4:
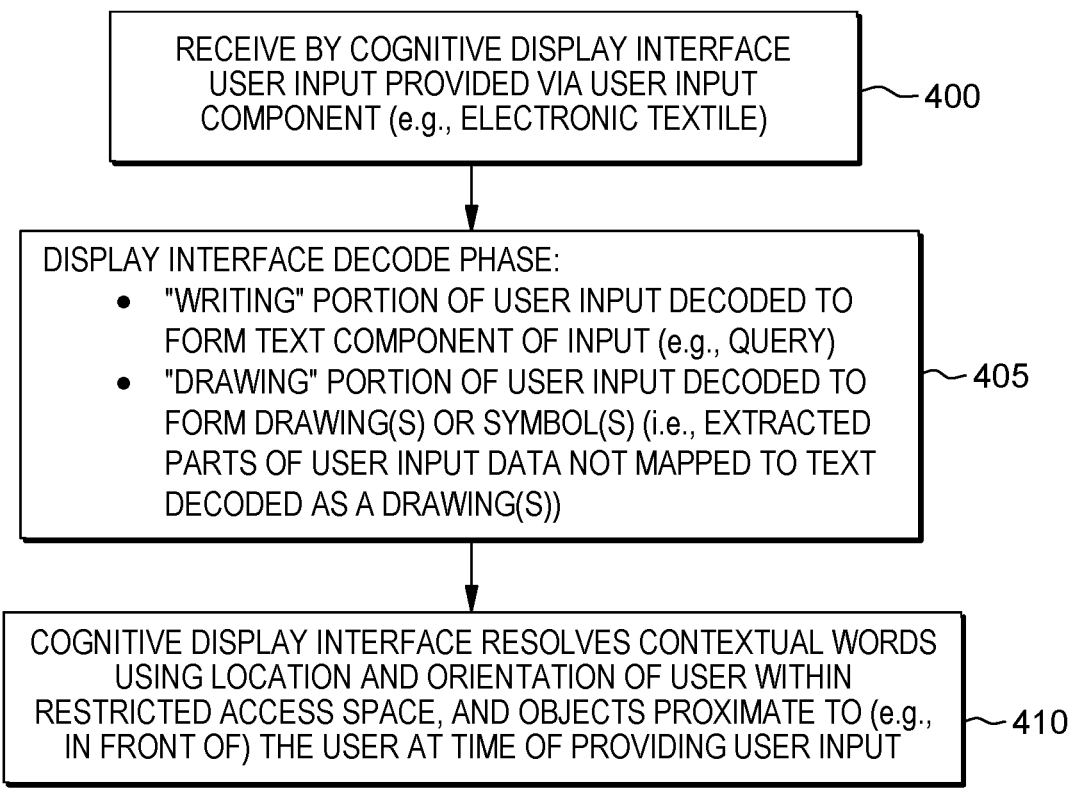
FIG. 4 depicts one embodiment of cognitive display interface processing including receiving input data, decoding the input data, and resolving context of the input data, in accordance with one or more aspects of the present invention.

FIG. 4 depicts one embodiment of cognitive display interface processing including receiving input data, decoding the input data, and resolving context of the input data, in accordance with one or more aspects of the present invention.

In one or more implementations, the cognitive display interface is communicatively coupled to receive user input data from a user input component(s) via (for instance) the registration process 400. For example, should a user have a question within the restricted access space, the user can (in one embodiment) physically contact the input component (e.g., electronic textile garment being worn by the user), and draw with a finger or stylus to write or draw on the surface of the input component. As a specific example, the user input could be "What does the symbol <☉> mean on the face of <this> server?" The cognitive display interface enters a decoding phase 405, where the "writing" portion of the input data is decoded to form a text component of the input. As noted, this can include mapping shapes drawn by the user into alphabetical characters, mapping the alphabetical characters into words, performing spell-corrections (in one embodiment), and forming textural components of the user input. In one or more embodiments, the drawing portion of the decode phase is decoded by extracting the parts of the user input that could not be mapped into alphabetical characters, and creating an image for each such extracted portion.

The cognitive display interface resolves any contextual words or data using location and orientation of the user and/or user input component, as well as (where appropriate) any objects, structures, etc., proximate to the user at the time of inputting the user input 410. For example, a contextual word to be resolved in the example above is "this", which is resolved using user location and orientation, and location of one or more objects within the restricted access space, such as location of one or more objects that are, for instance, in front of the user at the time of the user input. In a data center example of a restricted access space, the particular server in a data rack in front of the user at the time of the user input could be identified for providing the context for the user input. In one or more implementations, the gaze of the user could also be monitored within the restricted access space to further identify the particular object that the user is looking at at the time of the user input, if desired.

Figure 5:
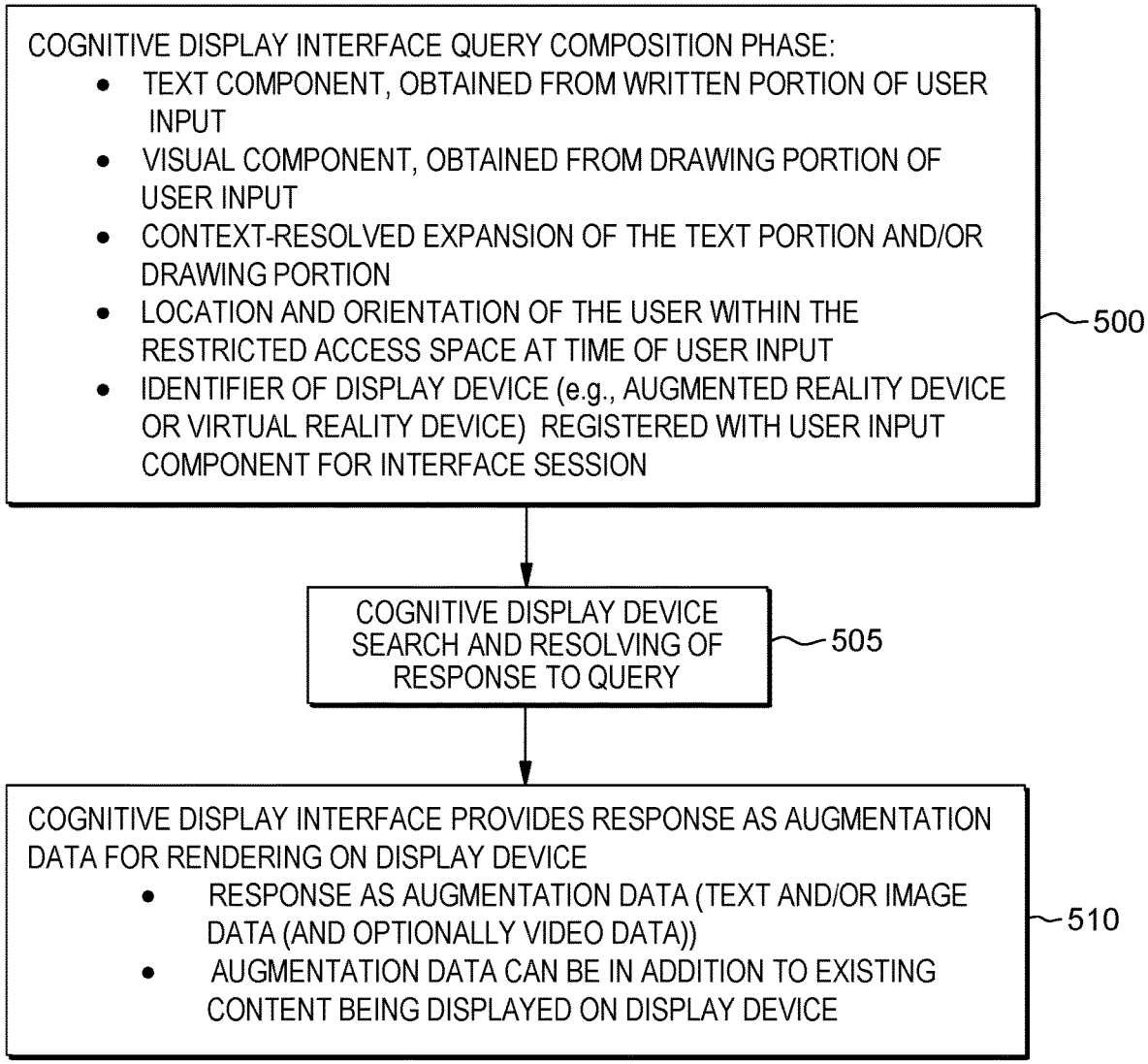
FIG. 5 depicts further details of one embodiment of cognitive display interface processing including search query composition and response processing, in accordance with one or more aspects of the present invention.

FIG. 5 depicts one embodiment of cognitive display interface processing which includes composing a search query and resolving a response to the query, in accordance with one or more aspects of the present invention.

As shown, the cognitive display interface performs query composition 500, which uses (in one or more embodiments) the text component obtained from the word part of the user input, a visual component, obtained from any drawing portion of the user input, a context-resolved expansion of the text and/or drawing input, based (for instance) on the location and orientation of the user within the restricted access space at the time of providing the user input. Further, an identifier of the display device (e.g., augmented reality device or virtual reality device) registered with the particular input component for the interface session is known. As noted, an electronic textile is provided herein as one example only of a user input component. Other input components, including audio-based inputs, could be provided for use in a system such as disclosed herein.

In one or more embodiments, traditional search techniques, as well as search techniques specific to augmented reality and/or virtual reality known in the literature can be used to find and rank search responses, such as located response answers, or documents, images, etc., 505. The cognitive display interface generates a response, for instance, selects the highest ranking response obtained via cognitive analysis, and the generated response is forwarded to the display rendering controller, and rendered, using existing rendering techniques. In one or more embodiments, the response is augmentation data, such as augmenting text and/or image data, video data, etc., that augments (for instance, overlays) an existing image of the display device. For example, the display content that would be delivered for display in the absence of the processing described herein, could be augmented (and optionally customized, using text and images responsive to the user input) with content that is retrieved by the cognitive display interface. For instance, in one or more embodiments, a user could stand in front of a computer rack in a data center and write "What is the symbol ( ) on this server LED panel?" Based on writing and/or drawing the inquiry on the input component, and while the traditional augmented reality display device would not have anything related to that symbol or inquiry as an input or output, the resultant augmented data is obtained and displayed with the existing image of the display device to address the user input pursuant to the cognitive display interface processing disclosed herein.

Further details of one or more embodiments of a method incorporating one or more aspects of the present invention are described with reference to FIGS. 6A & 6B.

Referring to FIG. 6A, in one embodiment, a cognitive display interface is provided to execute on a computer system and operatively couple to a display device (600). Operationally, cognitive display interface processing includes receiving the user input and context-related data associated with the user input, the user providing the user input within a restricted access space, the restricted access space including one or more sensors, the one or more sensors providing, at least in part, the context-related data (602), and analyzing the context-related data to determine, at least in part therefrom, a location and an orientation of the user within the restricted access space at the time of the user providing the user input (604). Additionally, cognitive display interface processing includes resolving context of the user input based, at least in part, on the determined location and orientation of the user within the restricted access space at the time of providing the user input (606), determining a search query from, at least in part, the user input and the resolved context of the user input (608), generating a response to the search query based, at least in part, on searching one or more databases (610), and providing the response as augmentation data for rendering on the display device for display to the user (612).

In one or more embodiments, determining the search query by the cognitive display interface is further reference to received data indicative of location of one or more objects within the restricted access space at the time of the user providing the user input (614).

As depicted in FIG. 6B, in one or more implementations, the cognitive display interface further operatively couples to a user input component within the restricted access space, with the user input being provided by the user via the user input component, and the user input component being an electronic component separate from the display device (616). In one embodiment, the user input component includes an electronic textile, the electronic textile being worn by the user (618).

In one implementation, the user input component includes a plurality of touch-sensitive electronic sensors, with the user input being provided by user contact with one or more sensors of the plurality of touch-sensitive sensors while writing on the user input component (620). In one or more embodiments, the cognitive display interface further receives a registration of the user input component and the display device for an interface session, with the receiving, analyzing, resolving, determining, generating, and providing occurring during the interface session (622).

In one or more embodiments, providing the response as augmentation data occurs in addition to display of an existing image on the display (624). In one embodiment, the display device lacks direct user control of displayed content, and is one of an augmented content device, an augmented reality device, and a virtual reality device (626). In one embodiment, the display device is worn by the user (628). Further, in one or more implementations, the restricted access space is a data center installation (630).

Further exemplary embodiments of a computing environment to implement one or more aspects of the present invention are described below with reference to FIGS. 7-9.

By way of further example, FIG. 7 depicts one embodiment of a computing environment 700, which includes a computing system 712. Examples of well-known computing systems, environments, and/or configurations that may be suitable for use with computer system 712 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 712 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 7, computing system 712, is shown in the form of a general-purpose computing device. The components of computing system 712 can include, but are not limited to, one or more processors or processing units 716, a system memory 723, and a bus 718 that couples various system components including system memory 723 to processor 716.

In one embodiment, processor 716 may be based on the z/Architecture® offered by International Business Machines Corporation, or other architectures offered by International Business Machines Corporation or other companies. z/Architecture is a registered trademark of International Business Machines Corporation, Armonk, N.Y., USA. One embodiment of the z/Architecture® is described in "z/Architecture Principles of Operation," IBM® Publication No. SA22-7832-11, 12th Edition, September 2017, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 712 can include a variety of computer system readable media. Such media may be any available media that is accessible by computing system 712, and it includes both volatile and non-volatile media, removable and non-removable media.

System memory 723 can include computer system readable media in the form of volatile memory, such as random access memory (RAM) 730 and/or cache memory 732. Computing system 712 can further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 718 by one or more data media interfaces. As described below, memory 723 can include at least one program product having a set (e.g., at least one) of program modules or code that are configured to carry out the functions of embodiments of the invention.

Program/utility 740, having a set (at least one) of program modules 742, can be stored in memory 732 by way of example, and not limitation, as well as an operating system, one or more application programs, other program modules, and program data. Each of the operating system, one or more application programs, other program modules, and program data or some combination thereof, can include an implementation of a networking environment. Program modules 742 generally carry out the functions and/or methodologies of embodiments of the invention as described herein. Alternatively, a cognitive display interface processing module, logic, etc., 701 can be provided within computing environment 712.

Computing system 712 can also communicate with one or more external devices 714 such as a keyboard, a pointing device, a display 724, etc.; one or more devices that enable a user to interact with computing system 712; and/or any devices (e.g., network card, modem, etc.) that enable computing system 712 to communicate with one or more other computing devices. Such communication can occur via Input/Output (I/O) interfaces 722. Still yet, computing system 712 can communicate with one or more networks such as a local area network (LAN), a general wide area network (WAN), and/or a public network (e.g., the Internet) via network adapter 720. As depicted, network adapter 720 communicates with the other components of computing system, 712, via bus 718. It should be understood that although not shown, other hardware and/or software components could be used in conjunction with computing system 712. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 7. Computer system/server 712 of FIG. 7 can be practiced in distributed cloud computing environments where tasks are performed by remote processing devices that are linked through a communications network. In a distributed cloud computing environment, program modules may be located in both local and remote computer system storage media including memory storage devices. Computer system/server 712 is capable of being implemented and/or performing any of the functionality set forth hereinabove.

Figure 8:
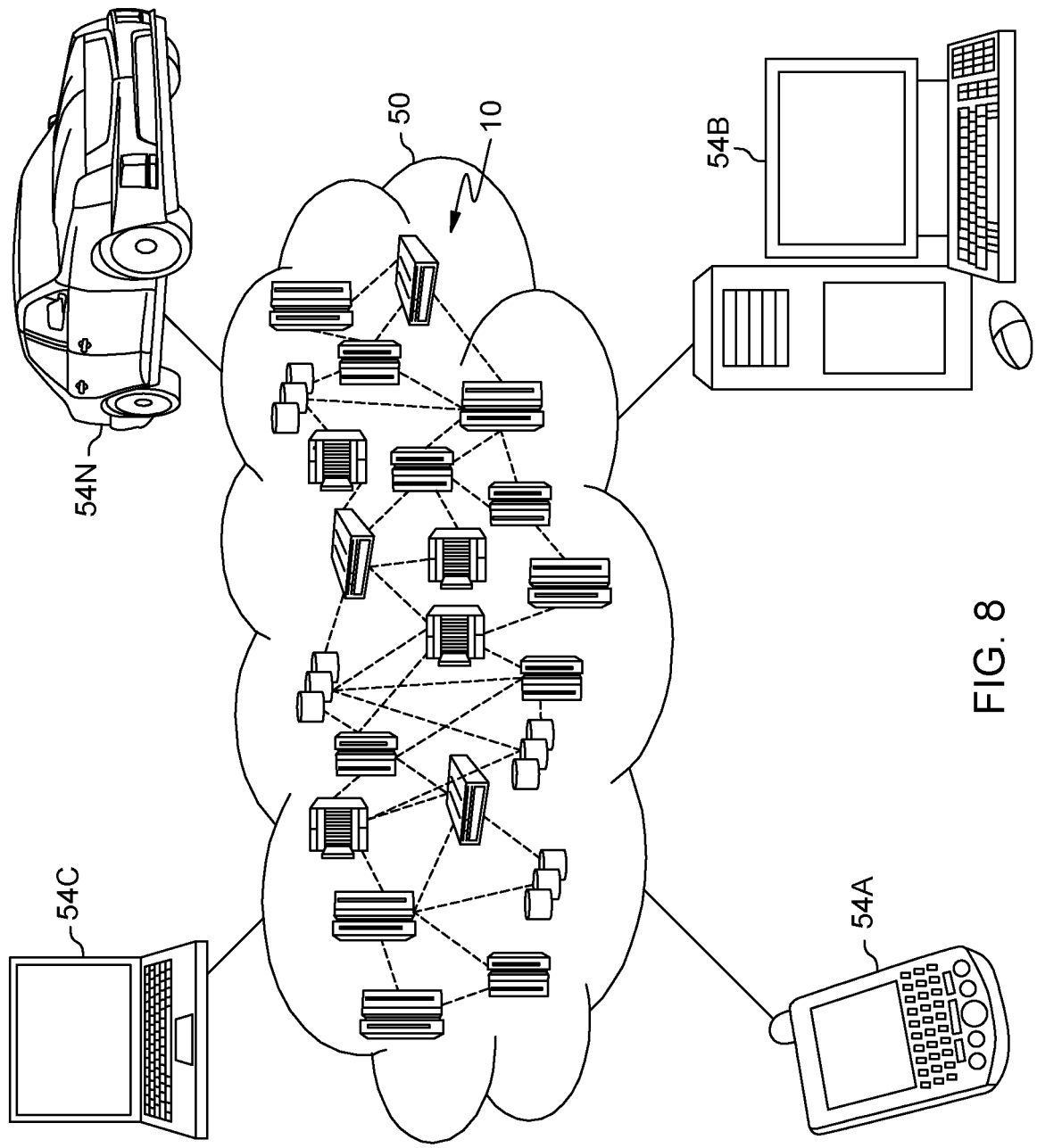
FIG. 8 depicts one embodiment of a cloud computing environment which can facilitate implementing, or be used in association with, one or more aspects of the present invention.

Referring now to FIG. 8, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50

Figure 9:
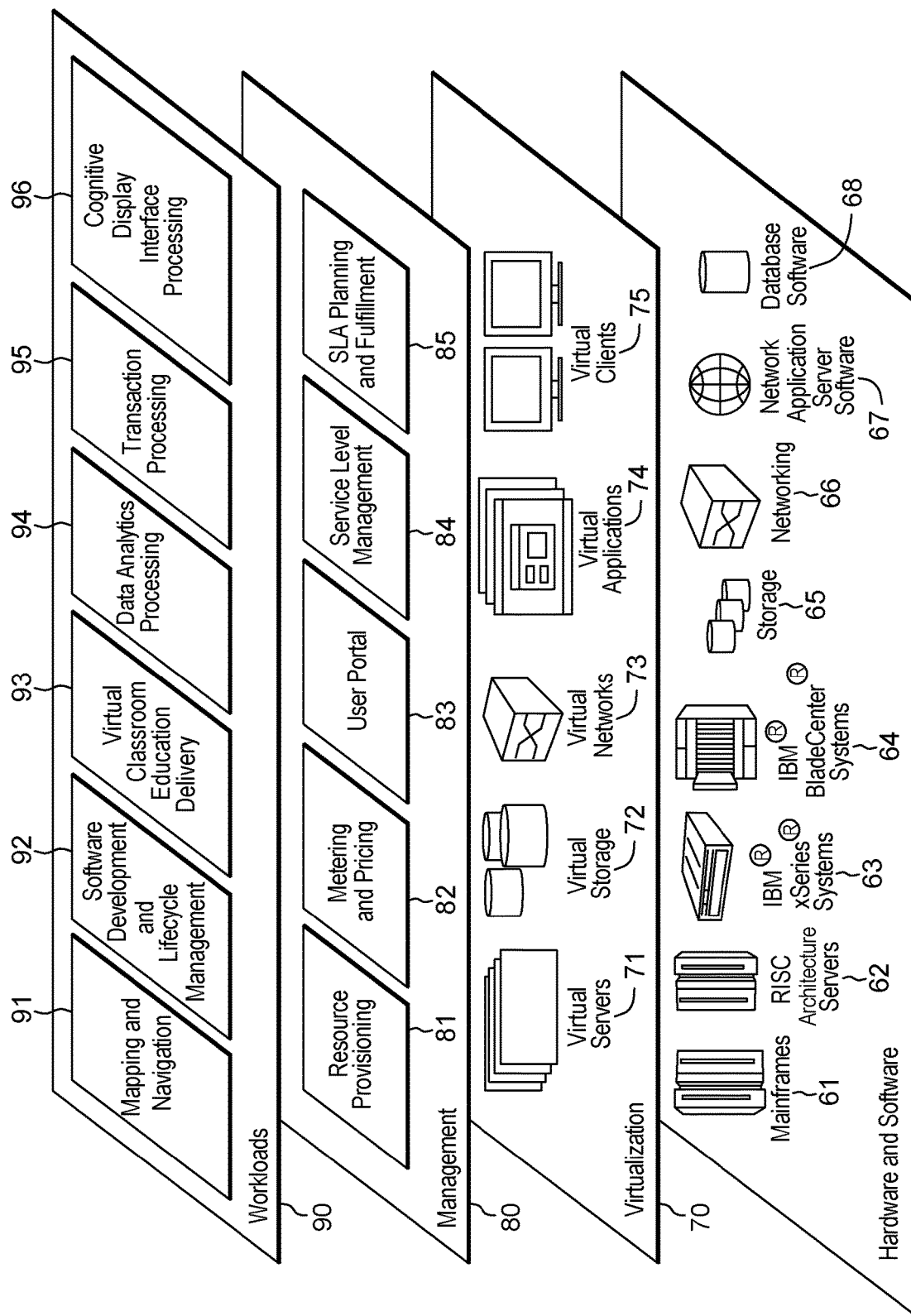
FIG. 9 depicts an example of abstraction model layers, which can facilitate implementing cognitive display interface processing, in accordance with one or more aspects of the present invention.

Referring to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive display interface processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method comprising:
    providing a cognitive display interface to execute on a computer system and operatively couple to a display device and a user input component, the user input component being an electronic component separate from the display device, and the cognitive display interface to provide augmentation data to the display device for display to a user based on a user input, the cognitive display interface:
        receiving a registration of the user input component and the display device for an interface session, and during the interface session, the cognitive display interface:
            receiving the user input and context-related data associated with the user input, the user providing the user input using the user input component within a restricted access space, the restricted access space including one or more sensors, the one or more sensors providing, at least in part, the context-related data;
            analyzing the context-related data to determine, at least in part therefrom, a location and an orientation of the user within the restricted access space at the time of the user providing the user input;
            resolving context of the user input based, at least in part, on the determined location and orientation of the user within the restricted access space at the time of providing the user input;
            determining a search query from, at least in part, the user input and the resolved context of the user input;
            generating a response to the search query based, at least in part, on searching one or more databases; and
            providing the response as augmentation data for rendering on the display device for display to the user.

2. The method of claim 1, wherein determining the search query by the cognitive display interface is further with reference to received data indicative of location of one or more objects within the restricted access space at the time of the user providing the user input.

3. The method of claim 1, wherein the user input component comprises an electronic textile, the electronic textile being worn by the user.

4. The method of claim 1, wherein the user input component includes a plurality of touch-sensitive electronic sensors, the user input being provided by user contact with one or more sensors of the plurality of touch-sensitive sensors while writing on the user input component.

5. The method of claim 1, wherein providing the response as augmentation data occurs in addition to display of an existing image on the display device.

6. The method of claim 1, wherein the display device lacks direct user control of display content, and is a device selected from the group consisting of an augmented content device, an augmented reality device, and a virtual reality device.

7. The method of claim 6, wherein the display device is worn by the user.

8. The method of claim 1, wherein the restricted access space is a data center installation.

9. A system comprising:
    a memory; and
    a processor in communication with the memory, wherein the system is configured to perform a method comprising:
        providing a cognitive display interface to execute on a computer system and operatively couple to a display device and a user input component, the user input component being an electronic component separate from the display device, and the cognitive display interface to provide augmentation data to the display device for display to a user based on a user input, the cognitive display interface:
            receiving a registration of the user input component and the display device for an interface session, and during the interface session, the cognitive display interface:
                receiving the user input and context-related data associated with the user input, the user providing the user input using the user input component within a restricted access space, the restricted access space including one or more sensors, the one or more sensors providing, at least in part, the context-related data;
                analyzing the context-related data to determine, at least in part therefrom, a location and an orientation of the user within the restricted access space at the time of the user providing the user input;
                resolving context of the user input based, at least in part, on the determined location and orientation of the user within the restricted access space at the time of providing the user input;
                determining a search query from, at least in part, the user input and the resolved context of the user input;
                generating a response to the search query based, at least in part, on searching one or more databases; and
                providing the response as augmentation data for rendering on the display device for display to the user.

10. The computer system of claim 9, wherein determining the search query by the cognitive display interface is further with reference to received data indicative of location of one or more objects within the restricted access space at the time of the user providing the user input.

11. The computer system of claim 9, wherein the user input component comprises an electronic textile, the electronic textile being worn by the user.

12. The computer system of claim 9, wherein the user input component includes a plurality of touch-sensitive electronic sensors, the user input being provided by user contact with one or more sensors of the plurality of touch-sensitive sensors while writing on the user input component.

13. The computer system of claim 9, wherein providing the response as augmentation data occurs in addition to display of an existing image on the display device.

14. The computer system of claim 9, wherein the display device lacks direct user control of display content, and is a device selected from the group consisting of an augmented content device, an augmented reality device, and a virtual reality device.

15. A computer program product comprising:
a non-transitory computer-readable storage medium readable by a processing circuit and storing instructions for execution by the processing circuit for performing a method comprising:
providing a cognitive display interface to execute on a computer system and operatively couple to a display device and a user input component, the user input component being an electronic component separate from the display device, and the cognitive display interface to provide augmentation data to the display device for display to a user based on a user input, the cognitive display interface:
receiving a registration of the user input component and the display device for an interface session, and during the interface session, the cognitive display interface:
receiving the user input and context-related data associated with the user input, the user providing the user input using the user input component within a restricted access space, the restricted access space including one or more sensors, the one or more sensors providing, at least in part, the context-related data;
analyzing the context-related data to determine, at least in part therefrom, a location and an orientation of the user within the restricted access space at the time of the user providing the user input;
resolving context of the user input based, at least in part, on the determined location and orientation of the user within the restricted access space at the time of providing the user input;
determining a search query from, at least in part, the user input and the resolved context of the user input;
generating a response to the search query based, at least in part, on searching one or more databases; and
providing the response as augmentation data for rendering on the display device for display to the user.

16. The computer program product of claim 15, wherein determining the search query by the cognitive display interface is further with reference to received data indicative of location of one or more objects within the restricted access space at the time of the user providing the user input.

* * * * *